United States Patent
Seki et al.

(10) Patent No.: US 10,050,257 B2
(45) Date of Patent: *Aug. 14, 2018

(54) ALUMINUM ALLOY FOIL FOR ELECTRODE CURRENT COLLECTORS AND MANUFACTURING METHOD THEREOF

(75) Inventors: Masakazu Seki, Chiyoda-ku (JP); Satoshi Suzuki, Chiyoda-ku (JP); Tomohiko Furutani, Kusatsu (JP); Kenji Yamamoto, Kusatsu (JP); Koichi Ashizawa, Kusatsu (JP)

(73) Assignees: UACJ CORPORATION, Tokyo (JP); UACJ FOIL CORPORATION, Tokyo (JP)

(*) Notice: Subject to any disclaimer, the term of this patent is extended or adjusted under 35 U.S.C. 154(b) by 288 days.

This patent is subject to a terminal disclaimer.

(21) Appl. No.: 13/995,916

(22) PCT Filed: Dec. 12, 2011

(86) PCT No.: PCT/JP2011/078722
§ 371 (c)(1),
(2), (4) Date: Jun. 19, 2013

(87) PCT Pub. No.: WO2012/086448
PCT Pub. Date: Jun. 28, 2012

(65) Prior Publication Data
US 2013/0302676 A1 Nov. 14, 2013

(30) Foreign Application Priority Data
Dec. 20, 2010 (JP) .................... 2010-283583

(51) Int. Cl.
*H01M 4/00* (2006.01)
*H01M 4/04* (2006.01)
*C22C 21/00* (2006.01)
*C22F 1/04* (2006.01)
*H01M 4/66* (2006.01)
*H01M 10/0525* (2010.01)

(52) U.S. Cl.
CPC ........... *H01M 4/0471* (2013.01); *C22C 21/00* (2013.01); *C22F 1/04* (2013.01); *H01M 4/662* (2013.01); *H01M 10/0525* (2013.01)

(58) Field of Classification Search
CPC ...... H01M 4/662; H01M 4/0471; H01M 4/66; H01M 4/04; H01M 10/0525; C22C 21/00; C21F 1/04; C22F 1/04
USPC ......... 429/244, 220, 230, 234, 211; 148/691
See application file for complete search history.

(56) References Cited

U.S. PATENT DOCUMENTS

| 3,770,515 | A | 11/1973 | Besel | |
|---|---|---|---|---|
| 6,447,982 | B1* | 9/2002 | von Asten | B41N 3/034 101/459 |
| 7,258,951 | B2* | 8/2007 | Woo et al. | 429/245 |
| 9,732,402 | B2* | 8/2017 | Seki | C22C 21/00 |
| 2008/0299000 | A1* | 12/2008 | Gheorghe et al. | 420/532 |
| 2009/0169917 | A1* | 7/2009 | De Smet et al. | 428/654 |
| 2009/0250144 | A1* | 10/2009 | Kumagai et al. | 148/535 |
| 2009/0269609 | A1 | 10/2009 | Hirayama | |
| 2010/0072584 | A1* | 3/2010 | Aruga et al. | 257/666 |
| 2011/0140517 | A1* | 6/2011 | Kusakari et al. | 307/9.1 |

FOREIGN PATENT DOCUMENTS

| JP | 58-221265 A | 12/1983 |
|---|---|---|
| JP | 63-018041 A | 1/1988 |
| JP | 01-215959 A | 8/1989 |
| JP | 04247855 A * | 9/1992 |
| JP | 9-041105 A | 2/1997 |
| JP | 11-219709 A | 8/1999 |
| JP | 2000-054046 A | 2/2000 |
| JP | 2000-054094 A | 2/2000 |
| JP | 2000-282196 A | 10/2000 |
| JP | 2001-288524 A | 10/2001 |
| JP | 2002-038234 A | 2/2002 |
| JP | 2002083594 A * | 3/2002 |
| JP | 2004-207117 A | 7/2004 |
| JP | 2008-150651 A | 3/2008 |
| JP | 2010-150637 A | 7/2010 |
| WO | WO 2010018646 A1 * | 2/2010 |

OTHER PUBLICATIONS

Translation of JP 63-018041 (as cited on the IDS) obtained from AIPN.*
English translation of Atushi et al. JP 2010-150637 (as cited in the IDS) obtained from AIPN.*
Machine translation of JP 2004-207117, obtained Mar. 14, 2017.*
Chinese Office Action dated Apr. 3, 2015, issued in Chinese Application No. 201180055886.4, filed Dec. 12, 2011, 11 pages.
International Search Report dated Mar. 13, 2012, issued in corresponding International Appplication No. PCT/JP2011/078722, filed Dec. 12, 2011, 2 pages.
Extended European Search Report dated Jul. 11, 2014, issued in corresponding European Application No. 11850339.0, filed Dec. 12, 2011, 7 pages.

(Continued)

Primary Examiner — Nicholas P D'Aniello
(74) Attorney, Agent, or Firm — Christensen O'Connor Johnson Kindness PLLC

(57) ABSTRACT

An aluminum alloy foil for an electrode current collectors has a high post-drying strength after application of an active material while keeping a high electrical conductivity. The aluminum alloy foil includes 0.1 to 1.0 mass % of Fe, 0.01 to 0.5% of Si, and 0.01 to 0.2 mass % of Cu, and the rest includes Al and unavoidable impurities. The aluminum alloy foil after final cold rolling has a tensile strength of 220 MPa or higher, a 0.2% yield strength of 180 MPa or higher, and an electrical conductivity of 58% IACS or higher. The aluminum alloy foil has a tensile strength of 190 MPa or higher and a 0.2% yield strength of 160 MPa or higher after the aluminum alloy foil is heat treated at any of 120° C. for 24 hours, 140° C. for 3 hours, and 160° C. for 15 minutes.

8 Claims, No Drawings

(56) References Cited

OTHER PUBLICATIONS

Japanese Information Statement, filed Jun. 17, 2015, in corresponding Japanese Patent Application No. 2012-549727, 11 pages.

* cited by examiner

ALUMINUM ALLOY FOIL FOR ELECTRODE CURRENT COLLECTORS AND MANUFACTURING METHOD THEREOF

TECHNICAL FIELD

The present invention relates to electrode current collectors used for secondary batteries, electric double-layer capacitors, lithium-ion capacitors, etc., and more particularly to aluminum alloy foils used for electrode materials of lithium-ion secondary batteries. The present invention further relates to an aluminum alloy foil used for a positive electrode material of a lithium-ion secondary battery.

BACKGROUND ART

Lithium-ion secondary batteries with high energy densities have been used as power sources for portable electronics such as a mobile phone and a notebook computer.

An electrode member of a lithium-ion secondary battery includes a positive electrode plate, a separator, and an anode plate. Regarding a positive electrode material, an aluminum alloy foil has been used as a support, having excellent electrical conductivity and less heat generation without affecting electrical efficiency of a secondary battery. An active material having a lithium-containing metal oxide such as $LiCoO_2$ as a chief component is applied on a surface of the aluminum alloy foil. Its production process includes: applying an active material with a thickness of about 100 μm on both sides of an aluminum alloy foil with a thickness of about 20 μm; and drying the active material to remove a solvent therefrom. Further, in order to increase the density of the active material, compression forming is performed with a pressing machine (hereinafter, this step is referred to as press working). The positive electrode plate as so manufactured, a separator, and an anode plate are stacked, and then the resulting stack is wound. After a shaping process is performed so as to encase the stack, it is encased.

An aluminum alloy foil used for a positive electrode material of a lithium-ion secondary battery has several problems that cuts occur during application of an active material and that ruptures occur at a bending portion during winding. Thus, a higher strength is required. At a drying step after the application of the active material, in particular, heat treatment is carried out at about 100 to 180° C. Accordingly, a lower strength after the drying step is likely to generate middle waviness during press working. This induces wrinkles during winding, which reduces adhesion between the active material and the aluminum alloy foil. Besides, a rupture is likely to occur during a slitting process. When the adhesion between the active material and a surface of the aluminum alloy foil decreases, their detachment is facilitated during repeated operation of discharge and charge. Unfortunately, this causes its battery capacity to decrease.

Recently, a high electrical conductivity has also been required for an aluminum alloy foil used for a positive electrode material of a lithium-ion secondary battery. What is meant by the electrical conductivity refers to physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or notebook computers. When a large current flows, a lower electrical conductivity causes internal resistance of a battery to increase. Consequently, this reduces its output voltage.

Meanwhile, 3003 alloy is generally used as a strong aluminum alloy foil for a lithium-ion secondary battery. The 3003 alloy primarily contains elements such as Si, Fe, Mn, and Cu, and is thus characteristic of high strength. Particularly because Mn is added, a solid solution amount of Mn is large. In addition to solid-solution elements that can prevent dislocation movement, fine precipitates are also present, so that its strength decrease is small. Mn, however, decreases electrical conductivity when forming solid solution. Therefore, the 3003 alloy is much lower in electrical conductivity than aluminum alloy whose Al purity is 99% or more. That is, the 3003 alloy has difficulty achieving both high strength and high electrical conductivity which are required for an aluminum alloy foil for a lithium-ion secondary battery.

Patent Literature 1 discloses an aluminum alloy foil with a tensile strength of 98 MPa or more, which foil is used for a battery current collector. Patent Literature 2 discloses an aluminum alloy foil with a tensile strength of 200 MPa or more, which foil is used for an electrode current collector of a lithium-ion secondary battery. Both Patent Literatures 1 and 2, however, disclose nothing about electrical conductivity.

Patent Literature 3 sets forth a method for preventing detachment from an active material without inducing plastic deformation during press working by increasing its strength. However, the alloy used contains Mn, Cu, and Mg as principal elements. Therefore, it is impossible to achieve a high electrical conductivity.

CITATION LIST

Patent Literature

[Patent Literature 1] JP2004-207117A
[Patent Literature 2] JPH11-219709A
[Patent Literature 3] JP2008-150651A

SUMMARY OF INVENTION

Technical Problem

It is an object of the present invention to provide an aluminum alloy foil for an electrode current collector, the foil having a high post-drying strength after application of an active material while keeping a high electrical conductivity.

Solution to Problem

The present inventors have investigated aluminum alloy foils used for positive electrode materials of lithium-ion secondary batteries. Next, their components have been specified within a suitable range; their ingot has been subjected to homogenizing treatment at a high temperature during their manufacturing process; and solid solution precipitation conditions for their elements are regulated. By doing so, the present inventors have found that the foils can maintain a higher strength after heat treatment during a drying step following application of an active material while keeping a high electrical conductivity. Then, the present invention has been completed.

Specifically, a first aspect of the present invention provides an aluminum alloy foil for an electrode current collector, comprising 0.1 to 1.0 mass % (hereinafter, "mass %" is simply referred to as "%") of Fe, 0.01 to 0.5% of Si, and 0.01 to 0.2% of Cu, with the rest consisting of Al and unavoidable impurities, wherein the aluminum alloy foil after final cold rolling has a tensile strength of 220 MPa or higher, a 0.2% yield strength of 180 MPa or higher, and an electrical conductivity of 58% IACS or higher; and the aluminum ally foil has a tensile strength of 190 MPa or higher and a 0.2% yield strength of 160 MPa or higher even after the aluminum alloy foil is subjected to heat treatment at any of 120° C. for 24 hours, 140° C. for 3 hours, and 160° C. for 15 minutes.

A second aspect of the present invention provides a method for manufacturing the aluminum alloy foil for an electrode current collector according to the first aspect, comprising: subjecting an aluminum alloy ingot to homogenizing treatment at 550 to 620° C. for 1 to 20 hours; and performing hot rolling at a starting temperature of 500° C. or higher and at an end-point temperature of 255 to 300° C.

Advantageous Effects of Invention

The present invention can provide aluminum alloy foils for electrode current collectors, including an aluminum alloy foil for a lithium-ion battery. The aluminum alloy foils have a high electrical conductivity. In addition, the post-drying strength after application of an active material is high, which generates no middle waviness during press working. Also, they can prevent detachment of the active material and raptures during a slitting process.

DESCRIPTION OF EMBODIMENTS

<Aluminum Alloy Foil Composition>

A composition of an aluminum alloy foil for a lithium ion battery according to an embodiment of the present invention contains 0.1 to 1.0% of Fe, 0.01 to 0.5% of Si, and 0.01 to 0.2% of Cu, wherein the rest consist of Al and unavoidable impurities.

Si is an element that increases strength by addition thereof, and 0.01 to 0.5% of Si is included. When the additive amount of Si is less than 0.01%, the strength hardly increases. In addition, Si is included in a common Al base metal as impurities. As a result, in order to restrict the amount to less than 0.01%, a high-purity base metal should be used. This is difficult to achieve in view of economic reasons. Meanwhile, when the additive amount of Si exceeds 0.5%, a large amount of Al—Fe—Si compound is present inside and on the surface of the aluminum alloy foil. Consequently, the number of pinholes increases, so that the amount is not preferable. More preferably, the Si content is set to be from 0.05 to 0.3%.

Fe is an element that increases strength by addition thereof, and 0.1 to 1.0% of Fe is included. When the additive amount of Fe is less than 0.1%, the strength does not increase. Meanwhile, when the additive amount of Fe exceeds 1.0%, a large amount of Al—Fe compound or Al—Fe—Si compound is present inside and on the surface of the aluminum alloy foil. Consequently, the number of pinholes increases, so that the amount is not preferable. More preferably, the Fe content is set to be from 0.3 to 0.8%.

Cu is an element that increases strength by addition thereof, and 0.01 to 0.2% of Cu is included. When the additive amount of Cu is less than 0.01%, the solid solution amount of Cu decreases. Consequently the strength is lowered. In contrast, when the additive amount of Cu exceeds 0.2%, hardenability during processing increases. Consequently, a cut is likely to occur during foil rolling. More preferably, the Cu content is set to be from 0.03 to 0.16%.

With regard to other points, a material of an embodiment of the present invention contains unavoidable impurities such as Cr, Ni, Zn, Mn, Mg, Ti, B, V, and/or Zr. An amount of each of the unavoidable impurities is preferably 0.02% or less, and a total amount thereof is preferably 0.15% or less.

<Original Sheet Strength>

With regard to an aluminum alloy primarily containing Fe, Si and Cu, a temperature of homogenizing treatment of an ingot thereof is made to increase, and each element, which is a trace amount, forms solid solution as much as possible. The above makes it possible to reduce dislocation movement, thereby retaining a higher strength. Further, as a solid solution amount increases, hardenability during processing increases. Accordingly, an increase in strength becomes larger by cold rolling and foil rolling, so that the strength of the aluminum alloy foil can be increased.

Tensile strength of an original sheet after final cold rolling should be 220 MPa or higher. Then, 0.2% yield strength thereof should be 180 MPa or higher. When the tensile strength is less than 220 MPa and/or the 0.2% yield strength is less than 180 MPa, the strength is insufficient. Consequently, tension imposed during application of an active material is likely to produce cuts and cracks. In addition, the above causes defects such as middle waviness, exerts adverse effects on its productivity, and is thus not preferred.

<Strength After Heat Treatment>

A step of manufacturing a positive electrode plate includes a drying step after application of an active material so as to remove a solvent from the active material. At this drying step, heat treatment is carried out at a temperature of about 100 to 180° C. This heat treatment may cause a change in mechanical property because an aluminum alloy foil is softened. Thus, the mechanical property of the aluminum alloy foil after the heat treatment is critical. During heat treatment at 100 to 180° C., external heat energy activates dislocation and facilitates its movement. This decreases strength in the course of restoration thereof. In order to prevent the strength decrease in the course of the restoration during the heat treatment, reducing the dislocation movement by using solid-solution elements or precipitates in the aluminum alloy is effective. In an aluminum alloy primarily containing Fe, Si, and Cu, in particular, a solid solution amount of Fe has a large effect. Specifically, Fe, which is a trace amount, forms solid solution as much as possible by increasing a temperature of homogenizing treatment of an ingot. Then, during hot rolling, the resulting Fe solid solution should not be subject to precipitation as much as possible, and an increased solid solution amount should be maintained. This can reduce the strength decrease after the heat treatment.

In an embodiment of the present invention, in order to achieve tensile strength of 190 MPa or higher and 0.2% yield strength of 160 MPa or higher after heat treatment at 120 to 160° C. for 15 minutes to 24 hours, conditions for the homogenizing treatment are regulated. If the tensile strength is less than 190 MPa or the 0.2% yield strength is less than 160 MPa after the heat treatment at 120 to 160° C. for 15 minutes to 24 hours, middle waviness is likely to occur during press working after the drying step. This causes wrinkles during winding, and readily generates detachment of an active material and ruptures during a slitting process. The above strengths are therefore not preferred.

<Electrical Conductivity>

Electrical conductivity should be 58% IACS or higher. The electrical conductivity represents a solid solution state of a solute element. An electrode current collector according to an embodiment of the present invention may be used for a lithium-ion secondary battery. In that case, when a discharge rate exceeds 5C, which is a high current level, electrical conductivity of less than 58% IACS is not preferable because the battery capacity decreases. Note that the "1C" means a current level to complete, in one hour, the discharge from a cell having the nominal capacity value when a constant current at the current level is discharged from the cell. Specifically, the "5C" means a condition indicating a current level at which its discharge can continue for ⅕ hour.

<Method for Manufacturing Aluminum Alloy Foil>

The following steps are used to manufacture an aluminum alloy ingot having the above alloy composition according to an embodiment of the present invention.

The aluminum alloy having the above composition can be used to prepare an ingot after casting in accordance with a common procedure. Examples of the procedure used for their manufacturing include semi-continuous casting and continuous casting. The aluminum alloy cast ingot is subjected to homogenizing treatment at 550 to 620° C. for 1 to 20 hours.

When the temperature of the homogenizing treatment is less than 550° C. or the retention time is less than 1 hour, elements such as Si and Fe form solid solution insufficiently. Accordingly, the solid solution amount is insufficient, and the strength is decreased. The above condition is thus not preferred. When the temperature exceeds 620° C., the ingot melts locally. In addition, a tiny amount of hydrogen gas mixed in during casting appears on the surface, thereby readily causing swelling on the material surface. The above condition is thus not preferred. Also, when the homogenizing treatment period exceeds 20 hours, this condition is not preferred in view of productivity and cost.

The above homogenizing treatment is followed by hot rolling, cold rolling, and foil rolling to produce an aluminum alloy foil with a thickness of 6 to 30 μm. The hot rolling starts at a temperature of 500° C. or higher after the homogenizing treatment. When the hot rolling has a starting temperature of less than 500° C., a precipitation amount of elements such as Si and Fe increases. Consequently, it is difficult to preserve a solid solution amount to improve its strength. The solid solution amount of Fe, in particular, has a large impact on maintenance of high strength. When the temperature ranges from 350 to 500° C., Fe is susceptible to precipitation as $Al_3Fe$ or an intermetallic compound for Al—Fe—Si series. Thus, a time going through this temperature range should be as short as possible. During the hot rolling, in particular, a time going through a temperature range from 350 to 500° C. is preferably within 20 minutes.

The end-point temperature of the hot rolling may be 255 to 300° C. The end-point temperature at the time of the hot rolling can be determined by changing a line speed and by thus adjusting processing heat and cooling conditions. Note that a hot-rolled aluminum sheet is wound and cooled as a coil at the outlet side of a hot roller.

In order to set the end-point temperature of the hot rolling to be less than 255° C., the line speed should be markedly decreased to prevent occurrence of the processing heat. This is not preferred because the productivity decreases. When the end-point temperature of the hot rolling exceeds 300° C., aluminum recrystallization proceeds inside the coil during cooling. Accordingly, accumulated strain is reduced and the strength is lowered. More preferably, the temperature range is set to be from 255 to 285° C.

During manufacturing of a general aluminum alloy foil, the strength of the aluminum alloy foil may be adjusted and its crystal grains may be regulated. For that purpose, intermediate annealing is usually performed before or partway through cold rolling. An aluminum alloy foil according to an embodiment of the present invention has better foil rolling characteristics, so that an aluminum alloy foil with a desired thickness can be prepared without performing the intermediate annealing. In the case of there being no intermediate annealing, in particular, Fe solid solution generated during the homogenizing treatment may remain the same until final cold rolling is completed. Accordingly, a higher strength after the final cold rolling and a higher strength after heat treatment at 120 to 160° C. for 15 minutes to 24 hours can be obtained. When the intermediate annealing is performed, the sheet thickness is from 0.4 to 1.3 mm. When a batch furnace is used, the sheet is retained at 300 to 500° C. for 1 to 5 hours. Note that when a continuous annealing furnace is used, the sheet is retained at 300 to 500° C. within 2 minutes. By doing so, the same effects as in the annealing using the above batch furnace can be obtained.

After the final cold rolling, the aluminum alloy foil should have a thickness of 6 to 30 μm. When the thickness is less than 6 μm, pin holes are likely to occur during foil rolling. This situation is not preferable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

The following details the present invention by using Examples. The Examples, however, are just examples, so that the present invention is not limited to these Examples. First, Examples and Comparative Examples with intermediate annealing during the course of rolling are described. Next, Examples and Comparative Examples without intermediate annealing are described.

1. Examples and Comparative Examples with Intermediate Annealing

Aluminum alloys having compositions designated in Table 1 were subjected to casting using semi-continuous casting to prepare ingots with a thickness of 500 mm. Next, those ingots were subjected to surface finishing, followed by homogenizing treatment under conditions designated in Table 1. Then, hot rolling was performed to produce sheets with a thickness of 3.0 mm. After that, cold rolling was performed to produce sheets with a thickness of 0.8 mm. Thereafter, intermediate annealing was carried out at 440° C. for 3 hours. Further, cold rolling and foil rolling were performed to prepare aluminum alloy foils with a thickness of 12 μm.

TABLE 1

| | No. | Si | Fe | Cu | Al and Unavoidable Impurities | Homogenizing Treatment Condition Temperature (°C.) | Period (hr) | Hot Rolling Condition Starting Temperature (°C.) | End-point Temperature (°C.) | Foil Thickness (μm) |
|---|---|---|---|---|---|---|---|---|---|---|
| Example | 1 | 0.01 | 0.14 | 0.14 | Rest | 620 | 3 | 550 | 255 | 12 |
| | 2 | 0.08 | 0.10 | 0.16 | Rest | 620 | 3 | 550 | 255 | 12 |
| | 3 | 0.13 | 0.46 | 0.01 | Rest | 620 | 3 | 550 | 255 | 12 |
| | 4 | 0.13 | 0.43 | 0.02 | Rest | 610 | 6 | 550 | 270 | 12 |
| | 5 | 0.18 | 0.58 | 0.11 | Rest | 610 | 6 | 550 | 270 | 12 |
| | 6 | 0.21 | 0.68 | 0.18 | Rest | 610 | 6 | 550 | 270 | 12 |
| | 7 | 0.14 | 0.47 | 0.03 | Rest | 580 | 6 | 530 | 270 | 12 |
| | 8 | 0.08 | 0.58 | 0.11 | Rest | 580 | 6 | 530 | 255 | 12 |
| | 9 | 0.08 | 0.58 | 0.11 | Rest | 580 | 6 | 530 | 280 | 12 |
| | 10 | 0.08 | 0.58 | 0.11 | Rest | 580 | 6 | 530 | 300 | 12 |
| | 11 | 0.14 | 0.49 | 0.19 | Rest | 580 | 6 | 530 | 295 | 12 |
| | 12 | 0.50 | 0.84 | 0.08 | Rest | 550 | 3 | 500 | 285 | 12 |
| | 13 | 0.28 | 1.00 | 0.11 | Rest | 550 | 3 | 500 | 285 | 12 |
| | 14 | 0.17 | 0.52 | 0.20 | Rest | 550 | 3 | 500 | 285 | 12 |
| Comparative Example | 1 | 0.60 | 0.98 | 0.10 | Rest | 580 | 3 | 530 | 260 | 12 |
| | 2 | 0.18 | 1.45 | 0.07 | Rest | 580 | 3 | 530 | 260 | 12 |
| | 3 | 0.04 | 0.09 | 0.03 | Rest | 580 | 3 | 530 | 260 | 12 |
| | 4 | 0.17 | 0.53 | 0.3 | Rest | 580 | 3 | 530 | 260 | 12 |
| | 5 | 0.17 | 0.41 | 0.001 | Rest | 580 | 3 | 530 | 260 | 12 |
| | 6 | 0.09 | 0.38 | 0.03 | Rest | 500 | 3 | 450 | 260 | 12 |
| | 7 | 0.08 | 0.35 | 0.02 | Rest | 580 | 0.5 | 530 | 260 | 12 |
| | 8 | 0.11 | 0.27 | 0.02 | Rest | 550 | 3 | 470 | 260 | 12 |
| | 9 | 0.09 | 0.31 | 0.03 | Rest | 580 | 3 | 530 | 330 | 12 |

Next, each aluminum alloy foil was used to prepare a positive electrode material for a lithium-ion secondary battery. PVDF as a binder was added to an active material primarily containing $LiCoO_2$ to yield a positive electrode slurry. This positive electrode slurry was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, the number of cuts during foil rolling, and the number of pinholes; the tensile strength and 0.2% yield strength after the heat treatment at 120° C. for 24 hours; the tensile strength and 0.2% yield strength after the heat treatment at 140° C. for 3 hours; and the tensile strength and 0.2% yield strength after the heat treatment at 160° C. for 15 minutes. Table 2 shows the results. Further, with regard to each positive electrode material, whether or not a cut occurred during an active-material-application step and whether or not the active material detached were evaluated. Table 3 shows the results.

Note that in Tables 2 and 3, Examples 1-1 to 1-14 correspond to Examples 1 to 14 in Table 1 and Comparative Examples 1-1 to 1-9 correspond to Comparative Examples 1 to 9 in Table 1, respectively.

TABLE 2

| | | Aluminum Alloy Foil | | | | | | | | | |
|---|---|---|---|---|---|---|---|---|---|---|---|
| | | Original Sheet Strength | | | | Pinhole | Heating at 120° C. for 24 Hours | | Heating at 140° C. for 3 Hours | | Heating at 160° C. for 15 Minutes | |
| | No. | Tensile Strength (N/mm2) | 0.2% Yield Strength (N/mm2) | Electrical Conductivity (% IACS) | Cut during Foil Rolling | Density × 10⁻³ Pinholes/m2 | Tensile Strength (N/mm2) | 0.2% Yield Strength (N/mm2) | Tensile Strength (N/mm2) | 0.2% Yield Strength (N/mm2) | Tensile Strength (N/mm2) | 0.2% Yield Strength (N/mm2) |
| Example | 1-1 | 226 | 184 | 61.0 | No | 0.1 | 212 | 180 | 201 | 173 | 192 | 163 |
| | 1-2 | 221 | 181 | 61.2 | No | 0.2 | 210 | 173 | 198 | 168 | 194 | 162 |
| | 1-3 | 235 | 185 | 59.7 | No | 0.1 | 226 | 177 | 215 | 171 | 203 | 166 |
| | 1-4 | 228 | 183 | 59.9 | No | 0.1 | 220 | 178 | 208 | 168 | 195 | 161 |
| | 1-5 | 285 | 237 | 59.4 | No | 0.1 | 274 | 230 | 265 | 222 | 253 | 215 |
| | 1-6 | 321 | 272 | 59.2 | No | 0.1 | 312 | 266 | 298 | 258 | 286 | 247 |
| | 1-7 | 222 | 181 | 60.3 | No | 0.2 | 215 | 173 | 202 | 169 | 194 | 162 |
| | 1-8 | 265 | 222 | 59.8 | No | 0.1 | 257 | 216 | 245 | 208 | 231 | 198 |
| | 1-9 | 259 | 216 | 59.9 | No | 0.2 | 238 | 201 | 234 | 197 | 229 | 194 |
| | 1-10 | 249 | 207 | 59.9 | No | 0.2 | 213 | 185 | 220 | 189 | 218 | 187 |
| | 1-11 | 299 | 250 | 59.1 | No | 0.1 | 287 | 241 | 279 | 237 | 265 | 224 |
| | 1-12 | 267 | 238 | 58.8 | No | 0.1 | 255 | 223 | 241 | 211 | 227 | 199 |
| | 1-13 | 253 | 216 | 59.8 | No | 0.2 | 244 | 207 | 235 | 199 | 222 | 187 |
| | 1-14 | 280 | 241 | 60.1 | No | 0.2 | 271 | 232 | 259 | 221 | 246 | 207 |

TABLE 2-continued

Aluminum Alloy Foil

| | No. | Original Sheet Strength Tensile Strength (N/mm2) | Original Sheet Strength 0.2% Yield Strength (N/mm2) | Electrical Conductivity (% IACS) | Cut during Foil Rolling | Pinhole Density × 10⁻³ Pinholes/m2 | Heating at 120° C. for 24 Hours Tensile Strength (N/mm2) | Heating at 120° C. for 24 Hours 0.2% Yield Strength (N/mm2) | Heating at 140° C. for 3 Hours Tensile Strength (N/mm2) | Heating at 140° C. for 3 Hours 0.2% Yield Strength (N/mm2) | Heating at 160° C. for 15 Minutes Tensile Strength (N/mm2) | Heating at 160° C. for 15 Minutes 0.2% Yield Strength (N/mm2) |
|---|---|---|---|---|---|---|---|---|---|---|---|---|
| Compara- | 1-1 | 259 | 222 | 57.9 | No | 2.8 | 246 | 208 | 234 | 197 | 223 | 188 |
| tive | 1-2 | 223 | 184 | 57.7 | No | 2.5 | 214 | 178 | 203 | 170 | 191 | 160 |
| Example | 1-3 | 188 | 157 | 62.1 | No | 0.3 | 172 | 149 | 164 | 142 | 153 | 131 |
| | 1-4 | 339 | 283 | 59.2 | Yes | 0.1 | 325 | 277 | 318 | 269 | 299 | 254 |
| | 1-5 | 174 | 155 | 60.4 | No | 0.2 | 168 | 148 | 161 | 144 | 153 | 137 |
| | 1-6 | 186 | 144 | 61.6 | No | 0.1 | 175 | 151 | 164 | 146 | 155 | 140 |
| | 1-7 | 178 | 150 | 59.8 | No | 0.1 | 172 | 146 | 167 | 139 | 159 | 128 |
| | 1-8 | 164 | 144 | 61.7 | No | 0.3 | 145 | 123 | 148 | 126 | 150 | 128 |
| | 1-9 | 169 | 150 | 61.4 | No | 0.2 | 148 | 126 | 150 | 124 | 152 | 130 |

TABLE 3

Cathode Material

| | No. | Heating at 120° C. for 24 Hours Cut during Active-material-application Step | Heating at 120° C. for 24 Hours Detachment of Active Material | Heating at 140° C. for 3 Hours Cut during Active-material-application Step | Heating at 140° C. for 3 Hours Detachment of Active Material | Heating at 160° C. for 15 Minutes Cut during Active-material-application Step | Heating at 160° C. for 15 Minutes Detachment of Active Material |
|---|---|---|---|---|---|---|---|
| Example | 1-1 | No | No | No | No | No | No |
| | 1-2 | No | No | No | No | No | No |
| | 1-3 | No | No | No | No | No | No |
| | 1-4 | No | No | No | No | No | No |
| | 1-5 | No | No | No | No | No | No |
| | 1-6 | No | No | No | No | No | No |
| | 1-7 | No | No | No | No | No | No |
| | 1-8 | No | No | No | No | No | No |
| | 1-9 | No | No | No | No | No | No |
| | 1-10 | No | No | No | No | No | No |
| | 1-11 | No | No | No | No | No | No |
| | 1-12 | No | No | No | No | No | No |
| | 1-13 | No | No | No | No | No | No |
| | 1-14 | No | No | No | No | No | No |
| Comparative | 1-1 | No | No | No | No | No | No |
| Example | 1-2 | No | No | No | No | No | No |
| | 1-3 | Yes | Yes | Yes | Yes | Yes | Yes |
| | 1-4 | No | No | No | No | No | No |
| | 1-5 | Yes | Yes | Yes | Yes | Yes | Yes |
| | 1-6 | Yes | Yes | Yes | Yes | Yes | Yes |
| | 1-7 | Yes | Yes | Yes | Yes | Yes | Yes |
| | 1-8 | Yes | Yes | Yes | Yes | Yes | Yes |
| | 1-9 | Yes | Yes | Yes | Yes | Yes | Yes |

<Tensile Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a chuck distance of 50 mm, and at a crosshead speed of 10 mm/min. In addition, in order to simulate the drying step, heat treatment at 120° C. for 24 hours, at 140° C. for 3 hours, or at 160° C. for 15 minutes was carried out. Then, the aluminum alloy foil was cut out in a direction of the rolling. After that, the tensile strength was measured in the same manner as in the above. The tensile strength of 220 MPa or higher was considered acceptable and the tensile strength of less than 220 MPa was determined as unacceptable. With regard to the tensile strength after the heat treatment at 120° C. for 24 hours, at 140° C. for 3 hours, or at 160° C. for 15 minutes, the tensile strength of 190 MPa or higher was considered acceptable and the tensile strength of less than 190 MPa was determined as unacceptable.

<0.2% Yield Strength>

Likewise, a tension test was conducted to determine 0.2% yield strength from a stress/strain curve.

The 0.2% yield strength of 180 MPa or higher was considered acceptable and the 0.2% yield strength of less than 180 MPa was determined as unacceptable. With regard to the 0.2% yield strength after the heat treatment at 120° C. for 24 hours, at 140° C. for 3 hours, or at 160° C. for 15 minutes, the 0.2% yield strength of 160 MPa or higher was considered acceptable and the 0.2% yield strength of less than 160 MPa was determined as unacceptable.

<Electrical Conductivity>

With regard to electrical conductivity, electrical resistivity was measured by a four-terminal method, and was converted to electrical conductivity. The electrical conductivity of 58% IACS or higher was considered acceptable and the electrical conductivity of less than 58% IACS was determined as unacceptable.

<Pinhole Density>

A foil-rolled aluminum alloy foil with a thickness of 12 μm was wound as a coil with a width of 0.6 m and a length of 6000 m. Then, the number of pinholes was determined with a surface detector. The number of pinholes determined was divided by a surface area of one side of the aluminum alloy foil to calculate the number of pinholes per unit area (1 m$^2$). This value was defined as a pinhole density. When the pinhole density was less than $2.0 \times 10^{-3}$ pinholes/m$^2$, the value was considered acceptable. When the pinhole density was $2.0 \times 10^{-3}$ pinholes/m$^2$ or more, the value was determined as unacceptable.

<Whether or not Cut Occurs During Active-Material-Application Step>

Whether or not a cut occurred in a positive electrode material applied during an active-material-application step was visually inspected. The case without a cut was considered acceptable, and the case with a cut was determined as unacceptable.

<Whether or not Active Material Detaches>

The presence or absence of the active material detachment was visually inspected. When no detachment occurred, the case was considered acceptable. When at least some detachment occurred, the case was determined as unacceptable.

In Examples 1-1 to 1-14, there was no occurrence of the active material detachment or a cut during the active-material-application step. In addition, their electrical conductivity was high. Thus, good evaluation results were achieved. In addition, when Examples 1-9 and 1-10 were compared, setting the end-point temperature of the hot rolling to be 285° C. or lower was found to increase the strength of the aluminum alloy foil.

In Comparative Example 1-1, the electrical conductivity was insufficient due to a large amount of Si. In addition, pinholes occurred.

In Comparative Example 1-2, the electrical conductivity was insufficient due to a large amount of Fe. In addition, pinholes occurred.

In Comparative Example 1-3, because of a small amount of Fe, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 1-4, because of a large amount of Cu, the hardenability during processing became too high, so that a cur occurred during foil rolling.

In Comparative Example 1-5, because of a small amount of Cu, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 1-6, because a low temperature of the homogenizing treatment caused an insufficient solid solution amount, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 1-7, because a short retention time for the homogenizing treatment caused an insufficient solid solution amount, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 1-8, because a low starting temperature of the hot rolling caused a solid solution amount of Fe to decrease, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 1-9, because of a high end-point temperature of the hot rolling, an aluminum alloy sheet was subject to recrystallization after the hot rolling. Also, the strength and the strength after heat treatment at 120° C. for 24 hours, at 140° C. for 3 hours, or at 160° C. for 15 minutes were insufficient. Consequently, a cut during the active-material-application step and active material detachment occurred.

2. Examples and Comparative Examples without Intermediate Annealing

Aluminum alloys having compositions designated in Table 1 were subjected to casting using semi-continuous casting to prepare ingots with a thickness of 500 mm. Next, those ingots were subjected to surface finishing, followed by homogenizing treatment under conditions designated in Table 3. Then, hot rolling was performed to produce sheets with a thickness of 3.0 mm. Further, cold rolling and foil rolling were continually performed without undergoing intermediate annealing to produce aluminum alloy foils with a thickness of 12 μm.

Then, each aluminum alloy foil was used to prepare a positive electrode material for a lithium-ion secondary battery. PVDF as a binder was added to an active material primarily containing LiCoO$_2$ to yield a positive electrode slurry. This positive electrode slurry was applied to both surfaces of the aluminum alloy foil with a width of 30 mm. Then, the resulting aluminum alloy foil was heated for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, the number of cuts during foil rolling, and the number of pinholes; the tensile strength and 0.2% yield strength after the heat treatment at 120° C. for 24 hours; the tensile strength and 0.2% yield strength after the heat treatment at 140° C. for 3 hours; and the tensile strength and 0.2% yield strength after the heat treatment at 160° C. for 15 minutes. Table 4 shows the results. Further, with regard to each positive electrode material, whether or not a cut occurred during an active-material-application step and whether or not the active material detached were evaluated. Table 5 shows the results. Note that each evaluation result was determined using the same criteria as in "1. Examples and Comparative Examples with Intermediate Annealing".

Note that in Tables 4 and 5, Examples 2-1 to 2-14 correspond to Examples 1 to 14 in Table 1 and Comparative Examples 2-1 to 2-9 correspond to Comparative Examples 1 to 9 in Table 1, respectively.

TABLE 4

Aluminum Alloy Foil

|  | No. | Original Sheet Strength | | Electrical Conductivity (% IACS) | Cut during Foil Rolling | Pinhole Density × $10^{-3}$ Pinholes/ m2 | Heating at 120° C. for 24 Hours | | Heating at 140° C. for 3 Hours | | Heating at 160° C. for 15 Minutes | |
|  |  | Tensile Strength (N/mm2) | 0.2% Yield Strength (N/mm2) |  |  |  | Tensile Strength (N/mm2) | 0.2% Yield Strength (N/mm2) | Tensile Strength (N/mm2) | 0.2% Yield Strength (N/mm2) | Tensile Strength (N/mm2) | 0.2% Yield Strength (N/mm2) |
|---|---|---|---|---|---|---|---|---|---|---|---|---|
| Example | 2-1 | 244 | 209 | 60.8 | No | 0.2 | 233 | 201 | 219 | 191 | 205 | 181 |
|  | 2-2 | 242 | 212 | 61.0 | No | 0.1 | 231 | 199 | 214 | 186 | 204 | 179 |
|  | 2-3 | 253 | 206 | 59.3 | No | 0.1 | 238 | 194 | 228 | 182 | 216 | 177 |
|  | 2-4 | 245 | 203 | 59.5 | No | 0.1 | 231 | 195 | 218 | 186 | 207 | 172 |
|  | 2-5 | 307 | 261 | 59.0 | No | 0.2 | 294 | 253 | 282 | 243 | 269 | 231 |
|  | 2-6 | 348 | 295 | 58.6 | No | 0.2 | 329 | 287 | 317 | 279 | 309 | 265 |
|  | 2-7 | 241 | 203 | 59.8 | No | 0.2 | 230 | 195 | 216 | 185 | 202 | 171 |
|  | 2-8 | 292 | 241 | 59.2 | No | 0.1 | 271 | 229 | 255 | 220 | 246 | 212 |
|  | 2-9 | 283 | 235 | 59.3 | No | 0.2 | 256 | 218 | 251 | 216 | 244 | 210 |
|  | 2-10 | 272 | 225 | 59.5 | No | 0.2 | 234 | 199 | 240 | 205 | 239 | 206 |
|  | 2-11 | 324 | 281 | 58.8 | No | 0.1 | 313 | 272 | 296 | 261 | 285 | 248 |
|  | 2-12 | 286 | 247 | 58.5 | No | 0.2 | 274 | 238 | 256 | 223 | 241 | 210 |
|  | 2-13 | 276 | 234 | 59.4 | No | 0.2 | 265 | 225 | 251 | 216 | 233 | 204 |
|  | 2-14 | 309 | 268 | 59.7 | No | 0.2 | 297 | 259 | 284 | 247 | 268 | 229 |
| Comparative Example | 2-1 | 283 | 246 | 57.6 | No | 2.6 | 264 | 235 | 249 | 218 | 236 | 207 |
|  | 2-2 | 241 | 202 | 57.3 | No | 2.4 | 227 | 194 | 216 | 184 | 202 | 173 |
|  | 2-3 | 197 | 168 | 61.7 | No | 0.3 | 177 | 159 | 168 | 152 | 161 | 146 |
|  | 2-4 | 356 | 302 | 58.7 | Yes | 0.1 | 343 | 289 | 327 | 274 | 311 | 268 |
|  | 2-5 | 187 | 163 | 59.8 | No | 0.2 | 177 | 156 | 169 | 148 | 156 | 139 |
|  | 2-6 | 198 | 167 | 61.4 | No | 0.1 | 179 | 157 | 171 | 149 | 163 | 143 |
|  | 2-7 | 184 | 162 | 59.5 | No | 0.1 | 172 | 151 | 185 | 142 | 171 | 134 |
|  | 2-8 | 175 | 152 | 61.5 | No | 0.2 | 154 | 134 | 155 | 138 | 159 | 140 |
|  | 2-9 | 182 | 158 | 61.3 | No | 0.2 | 159 | 138 | 162 | 141 | 164 | 142 |

TABLE 5

Cathode Material

|  | No. | Heating at 120° C. for 24 Hours | | Heating at 140° C. for 3 Hours | | Heating at 160° C. for 15 Minutes | |
|  |  | Cut during Active-material-application Step | Detachment of Active Material | Cut during Active-material-application Step | Detachment of Active Material | Cut during Active-material-application Step | Detachment of Active Material |
|---|---|---|---|---|---|---|---|
| Example | 2-1 | No | No | No | No | No | No |
|  | 2-2 | No | No | No | No | No | No |
|  | 2-3 | No | No | No | No | No | No |
|  | 2-4 | No | No | No | No | No | No |
|  | 2-5 | No | No | No | No | No | No |
|  | 2-6 | No | No | No | No | No | No |
|  | 2-7 | No | No | No | No | No | No |
|  | 2-8 | No | No | No | No | No | No |
|  | 2-9 | No | No | No | No | No | No |
|  | 2-10 | No | No | No | No | No | No |
|  | 2-11 | No | No | No | No | No | No |
|  | 2-12 | No | No | No | No | No | No |
|  | 2-13 | No | No | No | No | No | No |
|  | 2-14 | No | No | No | No | No | No |
| Comparative Example | 2-1 | No | No | No | No | No | No |
|  | 2-2 | No | No | No | No | No | No |
|  | 2-3 | Yes | Yes | Yes | Yes | Yes | Yes |
|  | 2-4 | No | No | No | No | No | No |
|  | 2-5 | Yes | Yes | Yes | Yes | Yes | Yes |
|  | 2-6 | Yes | Yes | Yes | Yes | Yes | Yes |
|  | 2-7 | Yes | Yes | Yes | Yes | Yes | Yes |
|  | 2-8 | Yes | Yes | Yes | Yes | Yes | Yes |
|  | 2-9 | Yes | Yes | Yes | Yes | Yes | Yes |

In Examples 2-1 to 2-14, there was no occurrence of the active material detachment or a cut during the active-material-application step. In addition, their electrical conductivity was high. Thus, good evaluation results were achieved. In addition, when Examples 2-9 and 2-10 were compared, setting the end-point temperature of the hot rolling to be 285° C. or lower was found to increase the strength of the aluminum alloy foil.

In Comparative Example 2-1, the electrical conductivity was insufficient due to a large amount of Si. In addition, pinholes occurred.

In Comparative Example 2-2, the electrical conductivity was insufficient due to a large amount of Fe. In addition, pinholes occurred.

In Comparative Example 2-3, because of a small amount of Fe, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 2-4, because of a large amount of Cu, the hardenability during processing became too high, so that a cut occurred during foil rolling.

In Comparative Example 2-5, because of a small amount of Cu, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 2-6, because a low temperature of the homogenizing treatment caused an insufficient solid solution amount, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 2-7, because a short retention time for the homogenizing treatment caused an insufficient solid solution amount, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 2-8, because a low starting temperature of the hot rolling caused a solid solution amount of Fe to decrease, the strength and the strength after heat treatment at 120° C. for 24 hours, at 140° C. for 3 hours, or at 160° C. for 15 minutes were insufficient. Consequently, a cut during the active-material-application step and active material detachment occurred.

In Comparative Example 2-9, because of a high end-point temperature of the hot rolling, an aluminum alloy sheet was subject to recrystallization after the hot rolling. Also, the strength and the strength after heat treatment at 120° C. for 24 hours, at 140° C. for 3 hours, or at 160° C. for 15 minutes were insufficient. Consequently, a cut during the active-material-application step and active material detachment occurred.

The invention claimed is:

1. An electrode current collector formed by the steps of: applying an active material onto an aluminum alloy foil obtained by final cold rolling of an aluminum alloy obtained by subjecting an aluminum alloy ingot, comprising 0.1 to 1.0 mass % of Fe, 0.01 to 0.5 mass % of Si, and 0.01 to 0.2 mass % of Cu, with the rest consisting of Al and unavoidable impurities, each of the unavoidable impurities being contained by 0.02 mass % or less, and a total amount of the unavoidable impurities being 0.15 mass % or less, to a homogenizing treatment at 550° C. to 620° C. for 3 to 6 hours, followed by a hot rolling, with a starting temperature of 500° C. to 550° C. and an end-point temperature of 255° C. to 300° C., and a cold rolling, wherein the aluminum alloy foil after the final cold rolling has a tensile strength of 220 MPa or higher, a 0.2% yield strength of 180 MPa or higher, and an electrical conductivity of 58% IACS or higher; and the aluminum alloy foil is capable of maintaining a tensile strength of 190 MPa or higher and a 0.2% yield strength of 160 MPa or higher even after the aluminum alloy foil is subjected to heat treatment at 120° C. for 24 hours, at 140° C. for 3 hours, or at 160° C. for 15 minutes.

2. A method for manufacturing the electrode current collector according to claim 1, comprising: subjecting an aluminum alloy ingot to homogenizing treatment at 550 to 620° C. for 3 to 6 hours; and performing hot rolling at a starting temperature of 500° C. to 550° C. and at an end-point temperature of 255 to 300° C.

3. The electrode current collector of claim 1, wherein the aluminum alloy foil comprises 0.03 to 0.16 mass % of Cu.

4. The electrode current collector of claim 1, wherein the aluminum alloy foil comprises 0.05 to 0.3 mass % of Si.

5. The electrode current collector of claim 1, wherein the aluminum alloy foil comprises 0.3 to 0.8 mass % of Fe.

6. A method for manufacturing the electrode current collector according to claim 3, comprising: subjecting an aluminum alloy ingot to homogenizing treatment at 550 to 620° C. for 3 to 6 hours; and performing hot rolling at a starting temperature of 500° C. to 550° C. and at an end-point temperature of 255 to 300° C.

7. A method for manufacturing the electrode current collector according to claim 4, comprising: subjecting an aluminum alloy ingot to homogenizing treatment at 550 to 620° C. for 3 to 6 hours; and performing hot rolling at a starting temperature of 500° C. to 550° C. and at an end-point temperature of 255 to 300° C.

8. A method for manufacturing the electrode current collector according to claim 5, comprising: subjecting an aluminum alloy ingot to homogenizing treatment at 550 to 620° C. for 3 to 6 hours; and performing hot rolling at a starting temperature of 500° C. to 550° C. and at an end-point temperature of 255 to 300° C.

* * * * *